(12) United States Patent
Schmidt

(10) Patent No.: US 9,601,864 B2
(45) Date of Patent: Mar. 21, 2017

(54) CHARGING CONNECTOR AND METHOD OF MOUNTING THE SAME

(71) Applicant: Sumitomo Wiring Systems, Ltd., Yokkaichi, Mie (JP)

(72) Inventor: Heiko Schmidt, Cologne (DE)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/876,884

(22) Filed: Oct. 7, 2015

(65) Prior Publication Data

US 2016/0104967 A1    Apr. 14, 2016

(30) Foreign Application Priority Data

Oct. 13, 2014 (DE) .................. 10 2014 015 148

(51) Int. Cl.
*H01R 13/436* (2006.01)
*H01R 13/52* (2006.01)

(52) U.S. Cl.
CPC ................ *H01R 13/5202* (2013.01)

(58) Field of Classification Search
CPC ................................ H01R 13/5202
USPC .............. 439/589, 205, 559, 562, 564
See application file for complete search history.

(56) References Cited

U.S. PATENT DOCUMENTS 3,576,517 A * 4/1971 Johnson ............ H01R 13/5221
    174/77 R
5,277,610 A * 1/1994 Krehbiel ............... H01R 13/74
    439/271
5,593,320 A * 1/1997 Konda ................ H01R 13/521
    439/589
5,601,449 A * 2/1997 Shinji ............... H01R 13/4367
    439/447
5,816,643 A * 10/1998 Itou ..................... B60L 11/1846
    296/97.22
5,924,893 A * 7/1999 Eidsvig .............. H01R 13/5227
    439/206

(Continued)

FOREIGN PATENT DOCUMENTS

DE    10 2012 105 139    12/2013
DE    10 2013 110 547    3/2015

(Continued)

OTHER PUBLICATIONS

German Search Report.

*Primary Examiner* — Neil Abrams
(74) *Attorney, Agent, or Firm* — Gerald E. Hespos; Michael J. Porco; Matthew T. Hespos

(57) ABSTRACT

A charging connector for charging a battery in a vehicle has a housing (51) mounted to a vehicle. A tower (60) is in the housing (51) and has at least one accommodating chamber (64) for accommodating at least one terminal fitting (80). The tower (60) is inserted into a mating hole (52) of the housing (51). A seal (70) is between the tower (60) and the housing (51). The accommodating chamber (64) has a fitting (64a) at a rear end for fitting the terminal fitting (80) and an exposed portion (64b) at a front end for exposing a leading contact (82) of the terminal fitting (80) to be contacted with a mating terminal fitting of a mating charging connector on a charging cable. The tower (60) can be assembled and disassembled from the housing (51) with the terminal fitting(s) (80) mounted within the accommodating chamber(s) (64) of the tower (60).

10 Claims, 3 Drawing Sheets

(56) References Cited

U.S. PATENT DOCUMENTS

| | | | | |
|---|---|---|---|---|
| 6,422,899 B1 * | 7/2002 | Miyazaki | H01R 13/748 | |
| | | | 439/271 | |
| 6,796,838 B2 * | 9/2004 | Yoshioka | H01R 13/748 | |
| | | | 439/607.01 | |
| 6,814,581 B2 * | 11/2004 | Matsuo | H01R 13/5202 | |
| | | | 439/35 | |
| 7,854,629 B1 * | 12/2010 | Albers | E21B 17/023 | |
| | | | 439/271 | |
| 7,878,866 B1 * | 2/2011 | Kwasny | B60L 11/1818 | |
| | | | 439/474 | |
| 8,052,472 B2 * | 11/2011 | Uchida | H01R 13/658 | |
| | | | 439/108 | |
| 8,167,653 B2 * | 5/2012 | Hasegawa | H01R 13/74 | |
| | | | 439/607.41 | |
| 8,257,101 B2 * | 9/2012 | Ichio | H01R 13/4367 | |
| | | | 439/206 | |
| 8,449,323 B2 * | 5/2013 | Omae | H01R 13/5202 | |
| | | | 439/559 | |
| 8,485,844 B2 * | 7/2013 | Omae | H01R 13/5202 | |
| | | | 439/559 | |
| 8,597,039 B2 * | 12/2013 | Osawa | H01R 13/5227 | |
| | | | 439/205 | |
| 8,740,632 B2 * | 6/2014 | Osawa | H01R 13/50 | |
| | | | 439/76.2 | |
| 9,059,534 B2 * | 6/2015 | Endo | H01R 13/5205 | |
| 9,209,582 B2 * | 12/2015 | Kashiwada | H01R 13/6315 | |
| 9,352,660 B2 * | 5/2016 | Osawa | B60L 11/1818 | |
| 9,365,125 B2 * | 6/2016 | Seelig | H01R 13/502 | |
| 9,368,902 B2 * | 6/2016 | Nakai | H01R 13/5202 | |
| 9,463,702 B2 * | 10/2016 | Fukushima | H01R 13/506 | |
| 9,472,882 B2 * | 10/2016 | Kurita | H01R 13/424 | |
| 9,478,899 B2 * | 10/2016 | Kurita | H01R 13/5227 | |
| 2009/0137153 A1 * | 5/2009 | Yoshioka | H01R 4/185 | |
| | | | 439/607.24 | |
| 2012/0295460 A1 | 11/2012 | Ichio et al. | | |
| 2013/0078846 A1 | 3/2013 | Sasaki et al. | | |
| 2016/0104967 A1 * | 4/2016 | Schmidt | H01R 13/5202 | |
| | | | 439/587 | |

FOREIGN PATENT DOCUMENTS

| | | |
|---|---|---|
| EP | 2 626 955 | 8/2013 |
| WO | 2014/057958 | 4/2014 |

* cited by examiner

CHARGING CONNECTOR AND METHOD OF MOUNTING THE SAME

BACKGROUND

1. Field of the Invention

The present invention relates to a vehicle-side charging connector to be mounted in a vehicle as well as to a method of mounting the same in a vehicle.

2. Description of the Related Art

Electric cars contribute to cleaner air in cities because they produce no harmful emissions. An electric vehicle (EV) recharged from the US grid electricity in 2008 emits about 115 grams of $CO_2$ per kilometer, whereas a conventional US-market gasoline powered car emits about 250 grams of $CO_2$ per kilometer. The concept "Vehicle to Grid" provides electric cars and hybrid vehicles as energy reservoir for the public power grid. In this concept, vehicles parking most time of their life, may be used as energy source and accumulator so as to compensate for peak loads in the public power grid. This concept however, requires a reliable electric connection of the vehicles with the public power grid, even under wet and hot/cold weather conditions of the parking space where the vehicle is parked.

Charging connectors for charging a vehicle-side battery installed e.g. in a hybrid vehicle or an electric vehicle are known. In these known connector systems, a vehicle-side connector is fixedly mounted in or at the vehicle and is connected with the battery of the vehicle. For charging the battery of the vehicle via an external charging cable from an external power source, a charging connector provided at an end of the charging cable may be connected with the vehicle-side connector so as to provide an electric connection between the external power source and the battery installed within the vehicle.

Upon charging, the charging connector is connected to the vehicle-side connector, the two connectors are held in a connected state by locking a lock-receiving portion provided on the vehicle-side connector and the locking portion to each other and charging is performed. After charging is completed, the unlocking portion is pushed to cancel the locked state of the locking portion and the lock-receiving portion, whereby the charging connector can be separated from the vehicle-side connector.

Such charging connectors are specified e.g. in the standard SAE J1772 and are known e.g. from EP 2 626 955 A1. In this well known charging connector system, the vehicle-side connector is provided with a mounting plate which is placed substantially along an opening edge of a mounting opening portion provided in a panel of the vehicle so as to fix the vehicle-side connector to the vehicle. When the mounting opening of the vehicle has to be changed due to changing the vehicle-side connector, the system is not very flexible. Moreover, the vehicle-side connector is normally bonded to the panel of the vehicle so as to provide a water-tight mounting of the vehicle-side connector. Accordingly, when the vehicle-side connector fails and needs to be replaced, the disassembly of the vehicle-side connector is laborious and many man hours are required for replacement.

Accordingly, there is a need to improve this situation. In particular, there shall be provided a vehicle-side charging connector having a high flexibility in view of changing a number of terminals for different applications as well as to provide a connector which can be easily assembled and/or mounted and de-mounted from a vehicle.

This object is solved according to the invention by the features of the independent claims. Particular embodiments of the invention are subject of the dependent claims.

SUMMARY

According to a first aspect, there is provided a charging connector for charging a battery installed in a vehicle comprising: a housing or casing to be mounted in or at a vehicle, in particular in an opening provided in a panel of the vehicle, at least one tower to be mounted in or to said housing and comprising at least one accommodating chamber for at least partly accommodating at least one terminal fitting, preferably a plurality of accommodating chambers, wherein said tower is to be mounted in or to said housing by at least partly inserting the tower into a mating hole of said housing, wherein at least one seal member is to be provided between the tower and the housing, wherein said accommodating chamber comprises at or near a rear side thereof a fitting portion for fitting the terminal fitting and at or near a front side an exposed portion for exposing a leading contact portion of the terminal fitting to be contacted with a mating terminal fitting of a mating charging connector provided at an end of a charging cable, and wherein the tower can be assembled and disassembled from said housing with the terminal fitting(s) mounted within the accommodating chambers of said tower.

By the fact that there is no fitting portion for fitting the terminal fitting within said housing and the terminal fittings are fitted only within the tower, the tower including the terminal fittings can easily be assembled and disassembled from the vehicle simply by removing the tower from the mating oblong hole provided within the housing. Accordingly, a replacement in case of an electric failure can be performed easily and fast. Moreover, in case of a design change such as a change of the number of the terminals or the size thereof, only the inner design of the tower needs to be changed without changing the housing. Accordingly, no change is required for the opening portion provided in the panel of a vehicle. Further, the cylindrical mounting surface provides a stiff assembly, so that a tilting of the tower mounted within the housing can be avoided.

Further, due to the two-piece design comprising the housing on one side and the tower including the terminal fittings on the other side, the manufacture and assembly procedure is facilitated. In particular, there are no undercuts which would be difficult to form when forming the connector from resin by insert-molding. Further, the wires of a wiring harness with which the terminal fittings are to be connected are very stiff. Therefore, the two-piece design provides the advantage of an improved and facilitated mounting procedure.

In the description, a front of the connector is referred to the side at which a mating charging connector can be inserted into the connector (vehicle-exterior side) and a rear of the connector is the opposite side mounted within the vehicle where the connecting wires are drawn out. Accordingly, the term "front side" designates the connecting side of the connector, i.e. the side where the mating connector is inserted into the connector. On the other hand, the rear side is the opposite side.

At least one sealing ring may be provided as a seal member in at least one groove arranged on an outer circumference of the tower and/or an inner circumference of said mating hole, preferably an O-ring made from silicone or rubber. Alternatively, a form sealing or an O-ring is provided between the tower and the housing in a radial and/or axial arrangement structure.

A sealing may be provided on the terminal fitting in front of a connection portion of the terminal fitting for connecting the terminal fitting with a wire. Accordingly, a barrel portion or connection portion of the terminal fitting is a dry area such that contact corrosion of a crimped connection of the terminal with the wire can be avoided so as to avoid an increase of an electric resistance.

Accommodating chambers for accommodating terminal fittings may be arranged along an inner circumference of the cylindrical tower.

The terminal fitting may be fit into the tower by at least partly fitting the leading contact portion into a corresponding fitting hole of the tower, in particular from a rear side.

A larger hole may be provided behind (at a rear side of) said fitting hole of the tower and the sealing may be provided in this larger hole so as to seal a rear side of the connector.

The tower may comprise at least one drain opening for draining water that may have entered a front side of the connector. The drain opening may be arranged in the exposed portion(s) of the accommodating chamber(s). The fact that water is drained from the tower via the drain openings provided in the exposed portion of the accommodating chamber leads to the advantage that the rear part of the connector is a dry area and there is no need to provide a drain within the vehicle such as a hose for draining water having entered the connector.

The drain openings may be formed easily due to the two-piece concept of the connector, as there are no undercuts in this case, so that there is a high degree of freedom for placing and arranging the drain openings. Accordingly, the drain openings may be displaced with respect to each other in the radial and/or axial direction.

The tower may comprise a larger diameter portion at a rear end thereof whose diameter is larger than the diameter of the mating hole of the housing. The larger diameter portion may abut on a rear surface of the housing when the tower is mounted in the housing from behind.

The charging connector may further comprise at least one rear cover for fixing the tower on the rear side of the housing.

According to a particular embodiment, the tower may have a cylindrical shape and the mating hole of the housing may be a cylindrical (oblong) hole. Accordingly, the manufacture of these components can be easily achieved. However, the invention is not limited to such configuration and the tower and the mating hole may also substantially be ellipsoid, square-shaped, rectangular or the like.

The disclosure also relates to a method of mounting a charging connector for charging a battery installed in a vehicle comprising the steps of: providing a housing or casing to be mounted in or at a vehicle, preferably in an opening provided in a panel of the vehicle, mounting at least one tower in said housing, said tower comprising at least one accommodating chamber for at least partly accommodating at least one terminal fitting, wherein said tower is to be mounted in said housing by at least partly inserting the tower into a mating (particularly oblong) hole of said housing, providing at least one seal member between the tower and/the housing, and at least partly fitting the terminal fitting in a fitting portion of said accommodating chamber, wherein said fitting portion is provided at or near a rear side of said accommodating chamber, and there is further provided, at or near a front side of said accommodating chamber, an exposed portion for exposing a leading contact portion of the terminal fitting to be contacted with a mating terminal fitting of a mating charging connector provided at an end of a charging cable, and wherein the tower can be assembled and disassembled from said housing with the terminal fitting(s) mounted within the accommodating chambers of said tower.

Specifically, at least one sealing ring may be provided as a seal member in at least one groove arranged on an outer circumference of the tower and/or an inner circumference of said mating hole, preferably an O-ring e.g. made from silicone or rubber. Alternatively, a form sealing or an O-ring is provided between the tower and the housing in a radial and/or axial arrangement structure.

Particularly, the method further comprises the step of mounting a rear cover on the rear side of said housing for fixing the tower.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION

Hereinafter, a particular embodiment of the present invention is described with reference to the accompanying drawings. The following embodiment is a specific example of the present invention and does not limit the technical scope of the present invention.

Figure 1:
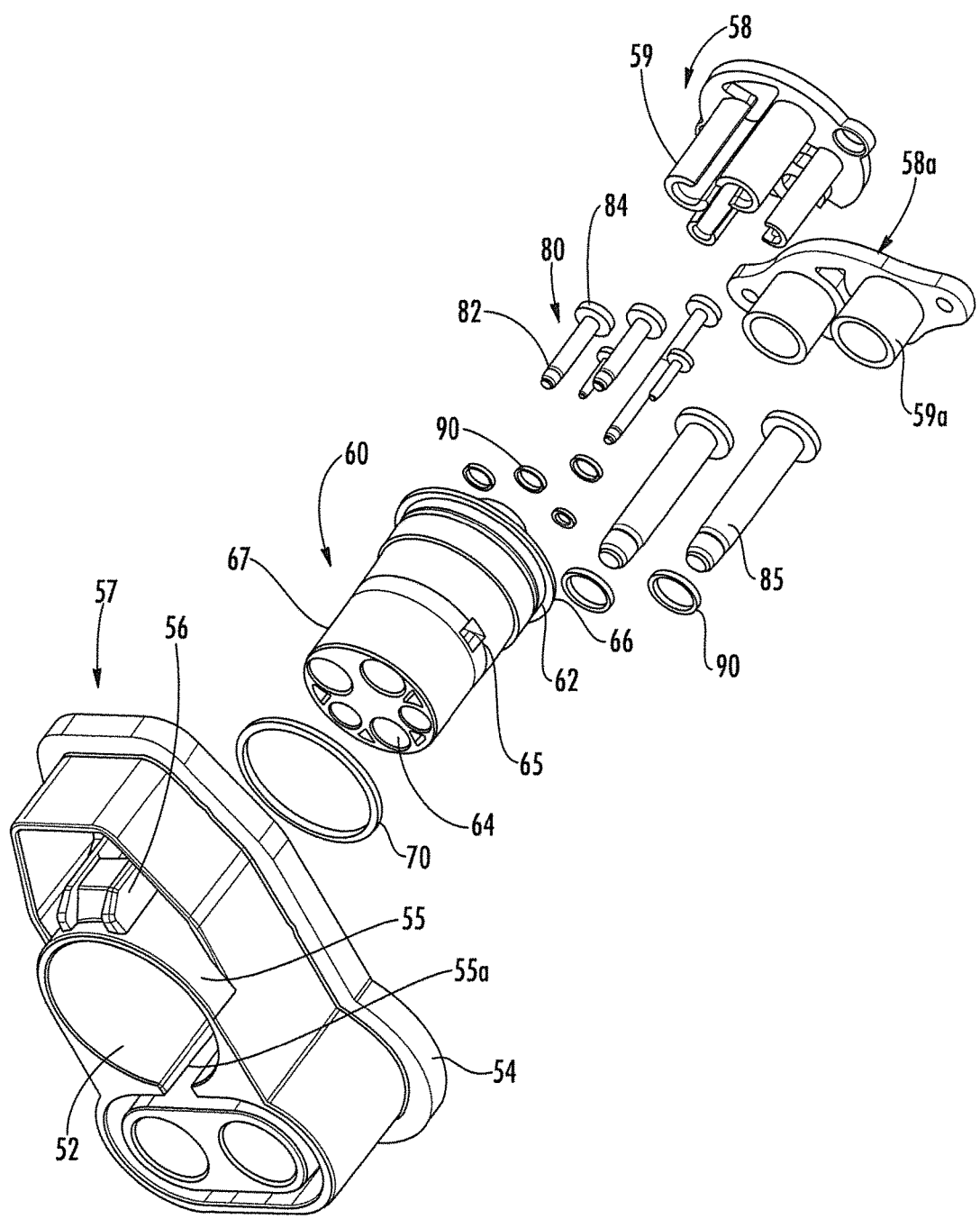
FIG. 1 shows an exploded view of the vehicle-side charging connector.
Figure 2:
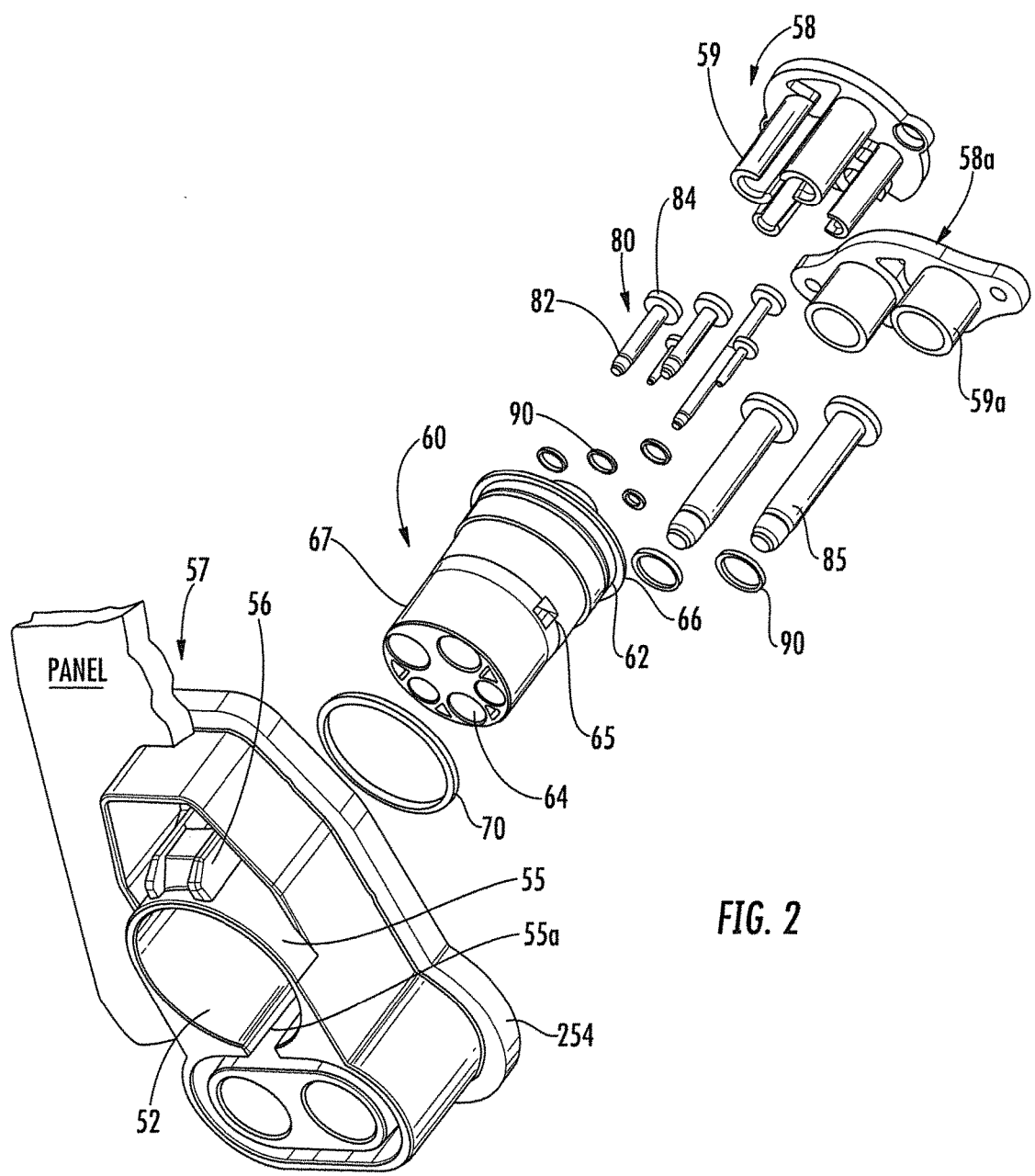
FIG. 2 shows a perspective view of the components of the charging connector.
Figure 3:
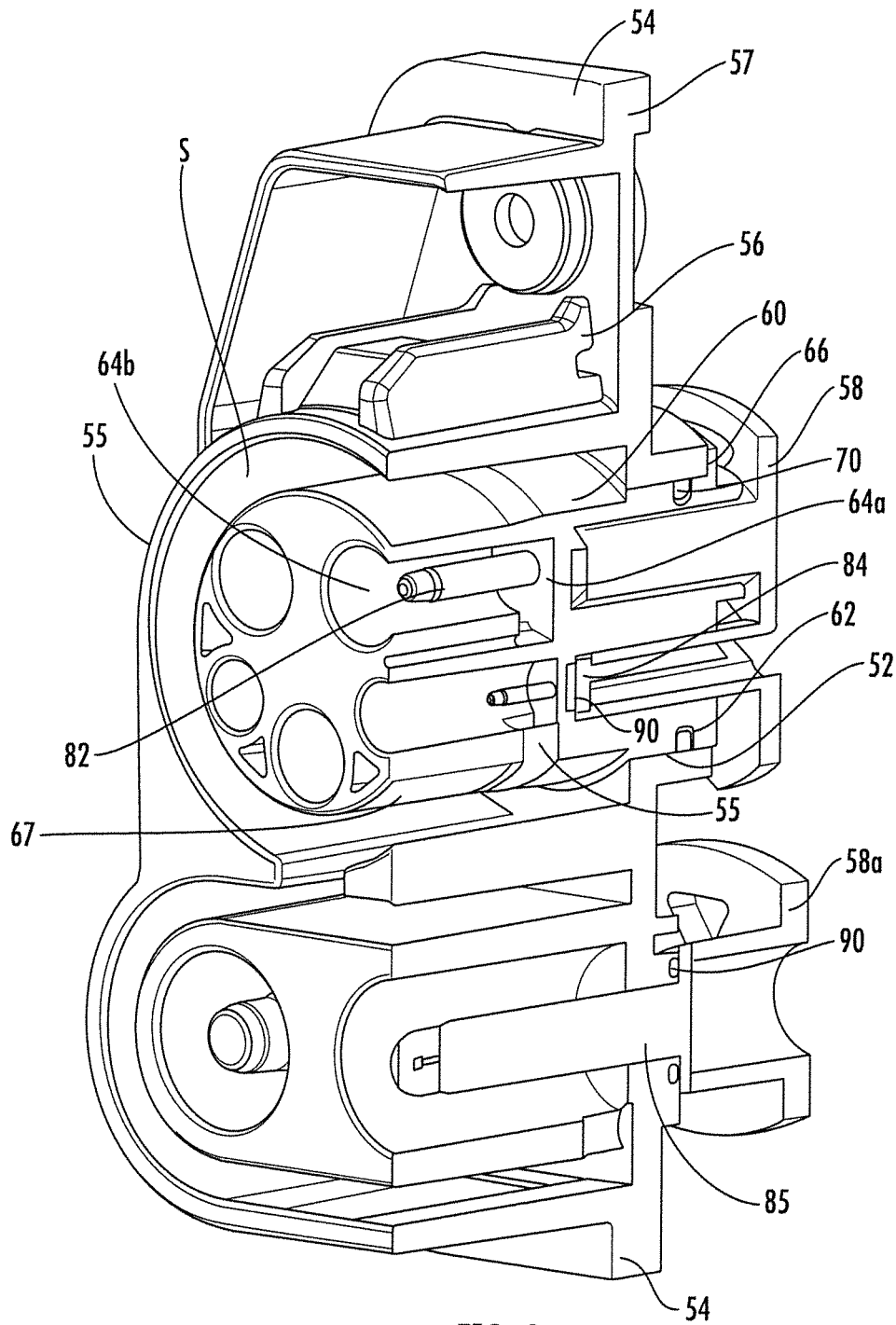
FIG. 3 shows a perspective view of the assembled charging connector with a part thereof cut out.

FIGS. 1 to 3 show a vehicle-side charging connector for an Electric Vehicle (EV) Conductive Charge Coupler according to one particular embodiment.

As shown in FIG. 1, the vehicle-side charging connector comprises a vehicle-side housing 51 being made e.g. of synthetic resin and/or having a mounting plate 54 to be arranged at an opening edge of a vehicle panel so as to mount the housing 51 of the connector at or in a mounting opening of the vehicle. The mounting plate 54 is preferably provided with a glue or a bonding agent such as Sikaflex® so as to bond and seal the mounting plate 54 to the opening edge of the vehicle panel. Alternatively or additionally, a separate seal may be provided, such as a silicone or rubber made sealing. The mounting plate 54 may also be alternatively or additionally fixed by one or more bolts, clips and/or engaging pawls or the like.

Moreover, the housing 51 is provided with at least one hole or receptacle 52 into which a tower 60 being separately provided can be inserted or mounted from a mounting side, particularly substantially from behind. The tower 60 is made e.g. of synthetic resin similar to the housing 51, wherein it may be provided of a different material e.g. in view of different electric properties (e.g. in view of providing a low current creepage). Preferably, the hole 52 has a sufficient length or axial extension so as to provide a proper or stiff support of the tower 60 such that a tilting thereof can be avoided. The hole 52 particularly has a length of approximately 10% to approximately 30% of the total length of the tower 60 thereby providing a good support.

Particularly, the cross-section of the tower 60 and the mating hole 52 substantially is cylindrical, rectangular or ellipsoid, such that the outer surface of the tower 60 receives an adequate support at the inner surface of the mating hole 52. In the described embodiment, the cross-section is substantially cylindrical which leads to the advantage that the manufacture thereof is facilitated.

Further, the housing 51 is provided with at least one lock projection 56 for locking a lever of a mating charging connector (not shown) provided at an end of an external charging cable or wire harness. This mating charging connector may be formed like the charging connector of EP 2 626 955 A1, which document is incorporated by reference.

The mating charging connector (not shown) to be connected to the vehicle-side charging connector comprises a case body including a connector fitting portion connectable to the vehicle-side connector; a locking portion for holding the vehicle-side connector and the charging connector in a connected state by being locked or interlocked by the lock projection 56 provided on the vehicle-side connector; an unlocking portion capable of canceling a locked state of the locking portion and the lock projection 56; and an unlocking hole formed in the case body at a position substantially corresponding to the unlocking portion, wherein the unlocking portion at least partly projects to the outside of the case body through the unlocking hole and includes at least one recess at a position substantially facing the peripheral edge of the unlocking hole.

According to this construction, a distance from the recess to the peripheral edge of the unlocking hole is longer as compared with the case where no recess is provided. Thus, even if water enters the recess, the action of surface tension is unlikely and water more easily runs down through the recess. Therefore, water does not stay in the recess and interference with an unlocking operation caused by freezing can be avoided.

The tower 60 is provided with at least one accommodating chamber 64 for at least partly accommodating a terminal fitting 80. The terminal fitting 80 particularly is formed of solid copper which may be nickel- and/or silver-plated. The terminal fitting 80 includes at or near a rear side thereof a rear recess into which an end of a charging cable can be inserted and conductively fixed. In the shown embodiment, a plurality of accommodating chambers 64, e.g. five accommodating chambers 64, particularly are provided in the tower 60 so as to at least partly accommodate a corresponding number of terminal fittings 80, e.g. five terminal fittings 80. The terminal fittings 80 are provided with a contact portion 82 at or near a front side thereof and these contact portions 82 at least partly are to be inserted into the accommodating chamber 64 such that the contact portions 82 at least partly are exposed within an exposed portion 64b of the accommodating chamber 64.

Further, as shown in FIG. 3, the terminal fitting 80 at least partly is fitted into the tower 60 by fitting the contact portion 82 from the mounting side (particularly substantially from the rear) within a fitting portion 64a of the accommodating chamber 64. Specifically, the terminal fitting 80 at least partly is to be fitted into the tower 60 along a fitting direction which particularly is substantially parallel to a mating direction of the terminal fitting 80 with a mating terminal of the mating charging connector. Moreover, at least one seal member or sealing 90 is provided at or near a rear end of the contact portion 82 so as to seal the fitting portion 64a of the accommodating chamber 64. Accordingly, water or any liquid having entered a front part of the accommodating chamber 64 is prevented from flowing rearwards (e.g. towards the vehicle inside) toward a portion behind the fitting portion 64a. In contrast, liquid or water having entered the front part of the accommodating chamber 64, i.e. the exposed portion 64b, is guided towards the outside of the connector via at least one drain opening 65 provided at the accommodating chamber 64, particularly at or near a bottom side thereof.

Moreover, at least one sealing ring 70 is provided within at least one corresponding groove 62 arranged at an outer circumference of the tower 60. This sealing ring 70 particularly may be an O-ring and/or a silicone ring and is dimensioned so as to provide a fluid- or water-tight sealing between an outer circumference of the tower 60 and an inner circumference of the cylindrical hole 52 by being squeezed substantially in a radial direction when the tower 60 at least partly is inserted into the cylindrical hole 52 of the housing 51. Although the groove 62 is arranged on an outer surface of the tower 60 in this embodiment, it should be clear that the groove 62 may also or alternatively provided within the cylindrical hole 52.

Alternatively, a form sealing or an O-ring may be provided between the tower 60 and the housing 51 such that it is squeezed in a radial and/or axial direction when assembling the tower 60 within the mating hole 52 of the housing 51.

In the following, a particular water management of the vehicle-side charging connector is described.

The (particularly each) accommodating chamber 64 is provided with at least one drainage or drain opening 65 particularly substantially at a bottom portion thereof such that liquid or water having entered a front side of the connector is guided outside the accommodating chamber 64 into a space S limited by a front portion of the tower (in correspondence with the exposed portion 64b) on an inner side and by a circumferential wall 55 of the housing 51 enclosing the tower 60 on an outer side. It should be understood that in case plural accommodating chambers 64 are provided with respective drain openings 65, it is easily possible to foresee the drain openings 65 in the tower 60, since this is manufactured (particularly molded) separately from the housing 51, specifically from the hole or receptacle 52. Moreover, it is advantageously possible to displace the position of the drain openings 65 in axial and/or circumferential positions, therefore improving mechanical properties of the tower 60 and/or electrical properties of the tower 60 e.g. by improving creepage distance between the respective terminal fittings 80 via the drain openings 65.

Further, the fluid or water having entered the space S runs to a bottom side of space S where a slit 55a is provided so as to guide the fluid outside of space S. Accordingly, it is advantageously possible to avoid that liquid or water enters an area behind the mounting plate 54.

In case of providing the (optional) DC contact pins 85 separate from the tower 60, an intermediate space IS is provided similar to space S. In this case, opening or slit 55a provides a direct connection between spaces S and IS. Accordingly, fluid having entered intermediate space IS can substantially flow to the bottom thereof where it can be guided outside of the connector by providing one or more corresponding drainage holes, slits or the like.

Moreover, the tower 60 is provided with a larger diameter portion 66, particularly having a flange-like shape, at or near a rear end thereof. Accordingly, when mounting the tower 60 to the housing 51, the tower 60 can be inserted into the cylindrical hole 52 from behind and axially displaced to such a position at which the larger diameter portion 66 substantially abuts on an abutment area at or corresponding to a rear end of the cylindrical hole 52 of the housing 51. Accordingly, the tower 60 can be properly and stably positioned with respect to the housing 51. Furthermore, when reaching the abutment position the operator is reliably informed of the proper mounting of the tower 60 so that ease of manufacturing is achieved.

Preferably, at least one rear cover 58 can be fixed or mounted to a rear side of the housing 51 particularly so as to fix or position or hold the tower 60 after having been at least partly inserted or fitted into the cylindrical hole 52. Further preferred, the rear cover 58 comprises cylindrical abutment portions 59 so as to fix or position the terminal fittings 80 and in particular a rear part thereof. These cylindrical abutment portions 59 particularly provide a double function by fixing the tower 60 in its assembled state on one hand, and on the other hand, leading and supporting (not shown) wires or cables drawn out from the rear side of the connector and connected with the terminal fittings 80. Accordingly, it can be particularly avoided that lateral forces acting on the wires or cables (e.g. due to their stiffness) cause the terminal fittings 80 from being tilted and/or radially displaced within the respective accommodating chambers 64. Thus, reliable connection of the properly positioned terminal fittings 80 with the mating terminal fittings (not shown) can be ensured.

The five terminals 80 of the above particular embodiment particularly may be used as the five AC terminals according to the standard SAE J1772.

Further, the connector may optionally be provided with at least one contact pin 85, specifically a pair of contact pins 85 in the shown embodiment, which is/are provided separate from the tower 60. These contact pins 85 may be applied so as to provide DC terminals and/or ground terminals and are inserted in a corresponding inserting hole(s) provided in the housing 51. Further, a rear cover 58a is provided and may be fixed to a rear surface of the housing 51 so as to fix the contact pins 85 within the housing 51. Accordingly, the rear cover 58a comprises corresponding (particularly substantially cylindrical) abutment portions 59a so as to press rear parts of the contact pins 85 towards the front of the housing 51.

As shown in FIG. 1, the vehicle-side connector (charging connector) includes a vehicle-side housing 51 connectable to a mating charging connector (not shown). The vehicle-side housing 51 particularly is made of synthetic resin and is at least partly fittable into a receptacle of a vehicle, such as a mounting opening (not shown) provided e.g. in a panel of the vehicle. A mounting plate 54 is formed to project from the outer periphery of the vehicle-side housing 51, and the vehicle-side housing 51 is to be mounted and fixed to the mounting opening of the vehicle by placing this mounting plate 54 substantially along the opening edge of the mounting opening and fixing (particularly bolting) it.

As shown in FIG. 3, the tower 60 projects substantially forward from the mounting plate 54. The lock projection 56 is provided on (particularly the upper surface of) the housing 51. As described before, the lock projection 56 is engageable (particularly substantially in a connecting direction) with a lever-side projection projecting from (particularly the lower surface of the leading end of) of an engaging lever of the mating charging connector. Accordingly, when the vehicle-side connector is connected to the mating connector provided at an end of a charging wire (not shown), the two connectors are held in a connected state (mechanically and electrically).

Specifically, the (particularly each) vehicle-side terminal or terminal fitting 80 particularly has a pin-shaped male-side contact portion 82, and a male-side flange portion 84 is so circumferentially provided as to project from the outer circumferential surface of this male-side contact portion 82. The male-side flange portion 62 substantially is in contact with (particularly a rear wall of) the accommodating chamber 64 provided in the tower 60 (particularly substantially from behind), and the male-side contact portion 82 is at least partly fitted into the accommodating chamber 64 particularly through this rear wall.

A core of the wire or cable (not shown) is to be connected with the male-side flange portion 84 via a wire connection portion (not shown) particularly substantially in the form of a recess into which an end of the core at least partly is to be inserted and fixed e.g. by soldering, brazing, welding or the like.

Further, a heat shrinkable tube may be mounted so as to at least partly cover the wire connection portion. The wire connection portion particularly is protected from liquid or water by this heat shrinkable tube. The vehicle-side rear cover 58, 58a for preventing the vehicle-side terminals 80 from coming out backward by being engaged with the male-side flange portions 84 of the vehicle-side terminals 80 (particularly substantially from behind) is mounted in or on a rear part of the vehicle-side housing 51.

In the following, an exemplary assembling or mounting method of the vehicle-side charging connector according to a particular embodiment is described.

At first, the housing 51 is mounted in the vehicle by at least partly inserting it into a panel opening or the like of the vehicle such that the mounting plate 54 abuts on the panel edge of the vehicle specifically with a sealing agent and/or a (separate) sealing provided in-between or sandwiched therebetween. Fixation of the housing 51 is achieved by application of a sealing agent providing sufficient bonding strength and/or by providing one or more fixing members such as bolts, rivets, clips or the like. However, the housing 51 may also be provided with an engagement pawl for engaging with an opening edge of the panel opening of the vehicle.

In a next step, the one or more terminal fittings 80 (and optionally the contact pins 85) are connected to respective end(s) of one or more wires of a wiring harness of a vehicle particularly by crimping, soldering, brazing, welding or the like.

Subsequently, the one or more seals or sealings 90 are arranged on a rear side of the contact portion 82 of each terminal fitting and/or at the rear side of each fitting portion 64a of the accommodating chamber 64. Thereafter, the terminal fittings 80 at least partly are fitted into the corresponding fitting portions 64a of the accommodating chambers 64 of the tower 60 particularly by pressing the flange portion 84 from a rear side towards the tower 60. Accordingly, a fluid- or water-tight sealing is provided for each terminal fitting 80 in such a manner that fluid having entered the exposed portion 64b of the accommodating chamber 64 cannot enter a rear side of the tower 60 where the terminal fitting 80 is connected with the wire or cable of the wiring harness.

As a result, there is provided an assembly including the wiring harness and the tower 60 provided at an end of the wiring harness with the terminal fittings electrically connected to the plurality of wires of the wiring harness and mechanically fitted and fixedly mounted within the accommodating chambers 64 of the tower.

Subsequently (particularly in a final step), the tower 60 is inserted into the mating hole or recess 52 of the housing 51 from the rear side thereof until the larger diameter portion 66 abuts on a rear surface of the housing 51. It should be noted that an abutment portion or at least one projection may be provided at a rear side of the tower 60 instead of the larger diameter portion 66 so as to limit the movement of the tower 60 towards the front side of the mating hole 52.

Further, a front side of the tower 60 may be provided with a smaller diameter portion 67 so as to facilitate insertion of the tower 60 into the mating hole 52.

The assembly method provides a very stiff connection between the tower 60 and the housing 51 by a great surface contact between the circumference of the tower 60 and the mating hole 52 of the housing 51. Moreover, a preferred drainage path may be easily formed without the problem of undercuts, due to the two-piece concept of tower 60 and housing 51. Furthermore, a creepage current can be minimized.

Specifically, in context of the present vehicle-side charging connector, there are plural standards which may be met. Specifically, SAE J1772 is a standard having the formal title "SAE Surface Vehicle Recommended Practice J1772, SAE Electric Vehicle Conductive Charge Coupler" and covers the general physical, electrical, communication protocol, and performance requirements for the electric vehicle conductive charge system and coupler. SAE J1772 defines a common electric vehicle conductive charging system architecture including operational requirements and the functional and dimensional requirements for the vehicle inlet and mating connector. Specifically, the SAE J1772 standard defines two charging levels, AC Level 1 (single-phase) 120V, 16 A providing 1.9 kW and AC Level 2 (split-phase) 240 V, 80 A providing 19 kW.

The SAE J1772 committee has also proposed a DC connector based on the SAE J1772-2009 AC connector shape with additional DC and ground pins to support charging at 200-450 V DC and 80 A (36 kW) for DC Level 1 and up to 200 A (90 kW) for DC Level 2. The SAE DC Level 3 charging levels have not been determined, but the standard as it exists as of 2009 has the potential to charge at 200-600 V DC at a maximum of 400 A (240 kW).

Up to now, national technical committee of auto standardization (NTCAS) have organized and drafted 56 electric vehicle standards (38 national standards and 18 automotive industry standards) which have been approved and released by standardisation authorities. In this context, crash safety and potential dangers from on-board high-energy and potential injury to occupants from high-voltage circuit have to be addressed, as e.g. in ECE-R 100. The charging connector described herein particularly is suitable to meet the requirements of SAE J1772 standard and SAE SAE J1772-2009. Furthermore, the charging connector described herein can also be configured to meet the IEC 62196-3 Fdis standard and/or IEC 62196-2 of the International Electrotechnical Commission.

It should be understood, that the present invention can be applied to different types of charging connectors designed for AC charging connectors (e.g. using SAE J1772™ compliant Level 1 & 2 connector) and/or DC charging connectors. Accordingly, the number and/or configuration of the terminal fittings 80 at least partly accommodated in the accommodating chambers 64 of the tower 60 are variable. The tower 60 separate from the housing 51 may comprise only terminal fittings relating to the AC charging, only terminal fittings relating to the DC charging or terminal fittings relating to both AC and DC charging (also referred to as combined charging system (CCS) type). Furthermore, two (or more) towers 60 separate from the housing 51 may be provided, such as a first tower accommodating terminal fittings relating to AC charging and a second tower accommodating terminal fittings relating to DC charging in order to provide a vehicle-side charging connector of the combined charging system (CCS) type.

LIST OF REFERENCE NUMERALS

51 housing
52 receptacle or hole
53 larger hole
54 mounting plate
55 circumferential wall
55*a* slit
56 lock projection
58 rear cover
58*a* rear cover
59 abutment portion
59*a* abutment portion
60 tower
62 groove
64 accommodating chamber
64*a* fitting portion
64*b* exposed portion
65 drain opening
66 larger diameter portion
67 small/smaller diameter portion
70 sealing ring (seal member)
80 terminal fitting
82 contact portion
84 flange portion
85 contact pin
90 sealing
IS intermediate space
S space

What is claimed is:

1. A charging connector for charging a battery installed in a vehicle, the vehicle having a panel with a mounting opening, the charging connector comprising:
   a housing with opposite front and rear ends and a mounting plate rearward of the front end, all of the housing forward of the mounting plate being dimensioned and configured to pass through the mounting opening in the panel of the vehicle, the mounting plate being larger than the mounting opening and having a front face configured for sealing engagement with the panel adjacent the mounting opening;
   at least one tower to be mounted in or to the housing and comprising at least one accommodating chamber for at least partly accommodating at least one terminal fitting, the tower being mounted in or to the housing by at least partly inserting the tower into a mating hole of the housing; and
   at least one seal between the tower and the housing,
   wherein said accommodating chamber comprises at or near a rear side thereof a fitting portion for fitting the terminal fitting and at or near a front side an exposed portion for exposing a leading contact portion of the terminal fitting to be contacted with a mating terminal fitting of a mating charging connector provided at an end of a charging cable, and
   wherein the tower can be assembled and disassembled from the housing with the terminal fitting mounted within the accommodating chamber of said tower.

2. The charging connector of claim 1, wherein a sealing is provided on the terminal fitting in front of a connection portion of the terminal fitting for connecting the terminal fitting with a wire and/or at least one seal member is to be provided on an outer circumference of the tower and/or an inner circumference of said mating hole and/or a form sealing or an O-ring is provided between the tower and the housing.

3. The charging connector of claim 1, wherein plural accommodating chambers for accommodating a plurality of terminal fittings are arranged along an inner circumference of the cylindrical tower.

4. The charging connector of claim 1, wherein the terminal fitting is fitted into the tower by at least partly fitting the leading contact portion into a corresponding fitting hole of the tower.

5. The charging connector of claim 4, wherein a larger hole is provided behind the fitting hole of the tower and the sealing is provided in this larger hole so as to seal a rear side of the connector.

6. The charging connector of claim 1, wherein the tower comprises at least one drain opening, and wherein the drain opening is arranged in the exposed portion (64b) of the accommodating chamber.

7. The charging connector of claim 1, wherein the tower comprises a larger diameter portion at a rear end thereof whose diameter is larger than a diameter of the mating hole of the housing, such that the larger diameter portion abuts on a rear surface of the housing when the tower is mounted in the housing from behind.

8. The charging connector of claim 1, further comprising at least one rear cover for fixing the tower on a rear side of the housing.

9. A method of mounting a charging connector for charging a battery installed in a vehicle, the vehicle having a panel with opposite inner and outer surfaces and a mounting opening extending through the panel from the inner surface to the outer surface, the method comprising the steps of:
providing a housing with opposite front and rear ends and a mounting plate rearward of the front end, the mounting plate having a front surface facing toward the front end of the housing, the housing having at least one mating hole;
passing the front end of the housing through mounting opening;
bonding and sealing the front surface of the mounting plate to the inner surface of the panel around a periphery of the mounting opening;
mounting at least one tower into the at least one mating hole of said housing, said tower comprising at least one accommodating chamber;
providing at least one seal member between the tower and the housing; and
fitting the terminal fitting in a fitting portion of said accommodating chamber, wherein said fitting portion is provided at or near a rear side of said accommodating chamber, and there is further provided, at or near a front side of said accommodating chamber, an exposed portion for exposing a leading contact portion of the terminal fitting to be contacted with a mating terminal fitting of a mating charging connector provided at an end of a charging cable, and wherein the tower can be assembled and disassembled from said housing with the terminal fitting mounted within the accommodating chamber of said tower.

10. The method of claim 9, further comprising mounting a rear cover on the rear side of said housing for fixing the tower.

* * * * *